March 28, 1950 G. F. CHODZIESNER 2,501,712
ARTICLE DISPENSING SYSTEM
Filed Oct. 28, 1947 4 Sheets-Sheet 2

*Inventor*
*Georg. F. Chodziesner*
By
*Attorneys.*

March 28, 1950 G. F. CHODZIESNER 2,501,712
ARTICLE DISPENSING SYSTEM
Filed Oct. 28, 1947 4 Sheets-Sheet 3

Inventor
Georg F. Chodziesner
By
Attorneys

Patented Mar. 28, 1950

2,501,712

UNITED STATES PATENT OFFICE 2,501,712

ARTICLE DISPENSING SYSTEM

Georg F. Chodziesner, Bondi, near Sydney, New South Wales, Australia, assignor to Communication Engineering Pty. Limited, Sydney, New South Wales, Australia, a corporation of Australia Application October 28, 1947, Serial No. 782,637 In Australia November 8, 1946

8 Claims. (Cl. 99—357)

The invention relates to a system for dispensing articles of varied character and more particularly to a system which dispenses foodstuff among other articles.

Article dispensing systems are known in which articles of various kinds and/or values can be selected from storage by a customer or operator by operating a key set or similar arrangement which releases the articles from storage and conveys them automatically to a point of delivery.

According to the invention such a system is connected with a cooking section which enables a customer or operator to transfer articles suitable for cooking to this cooking section and then to deliver said article to a point of delivery, thus giving the customer the opportunity to get a meal while he is waiting for the delivery of other articles he wants to collect from storage. Routing means are provided which enable the customer to select articles suitable for cooking either in the cooked or in the uncooked state.

According to another feature of the invention, the routing means consists of a conveyor belt with driving means so arranged that the belt can be driven in either of two directions. In one direction of movement the articles dispensed from storage are transferred directly to a delivery counter to be handed over in the uncooked state to the customer and in the opposite direction the selected articles are transferred to the cooking section.

According to a further feature of the invention, the cooking section comprises a plurality of cooking units and means to selectively transfer released articles automatically to one of said cooking units. Each of the cooking units has a movable grate or conveyor. Control means are provided to automatically control, in relation to the kind of article to be cooked, the temperature in the cooking unit used and/or the movement of the corresponding grate.

According to another feature of the invention each cooking unit has a plurality of adjustable heating elements and the grate of the cooking unit conveys the articles to the heating elements and passes them on to common conveying means after a predetermined time interval.

Still another feature of the invention consists in the provision of arrangements whereby the cooked articles are placed on plates or suitable dishes when they are passed on from a grate to the common conveying means.

According to another feature of the invention, the heating elements are heated by electrical current preferably by current of high frequency.

These and other features of the invention will be more clearly understood from the following description in connection with the drawings in which Fig. 1 shows schematically the main parts of an article dispensing system including a cooking section and their electrical connections;

Figure 1:
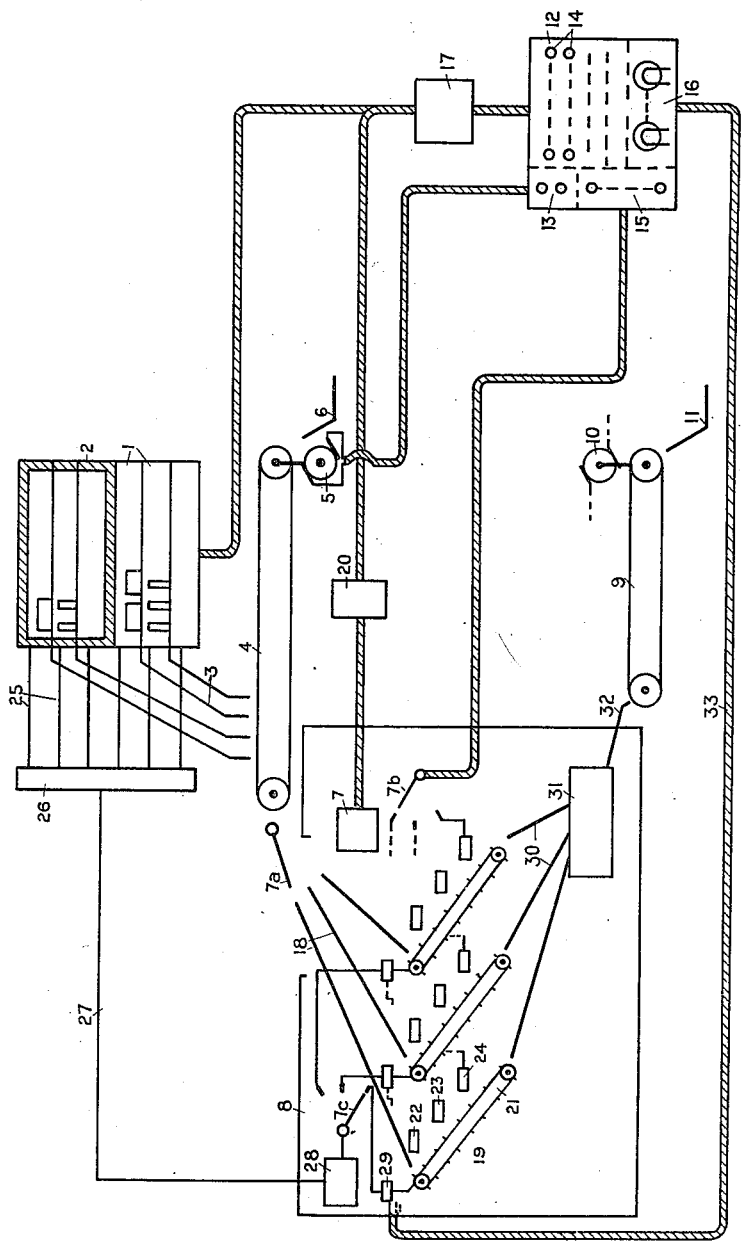
Figure 4A:
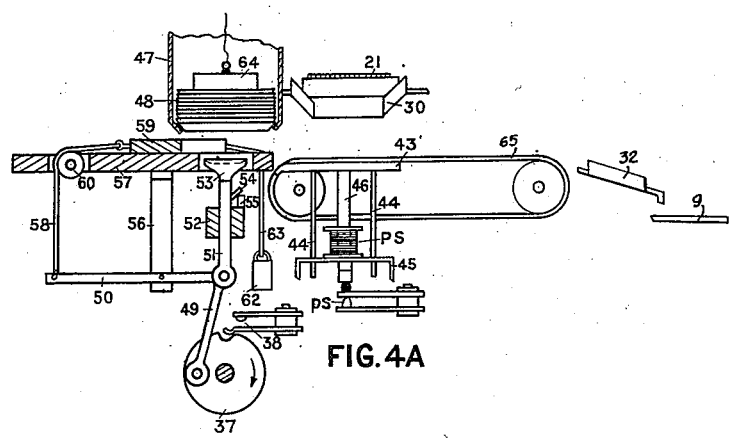
Figure 4B:
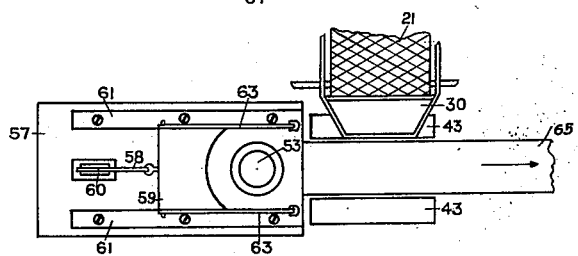
Figure 5:
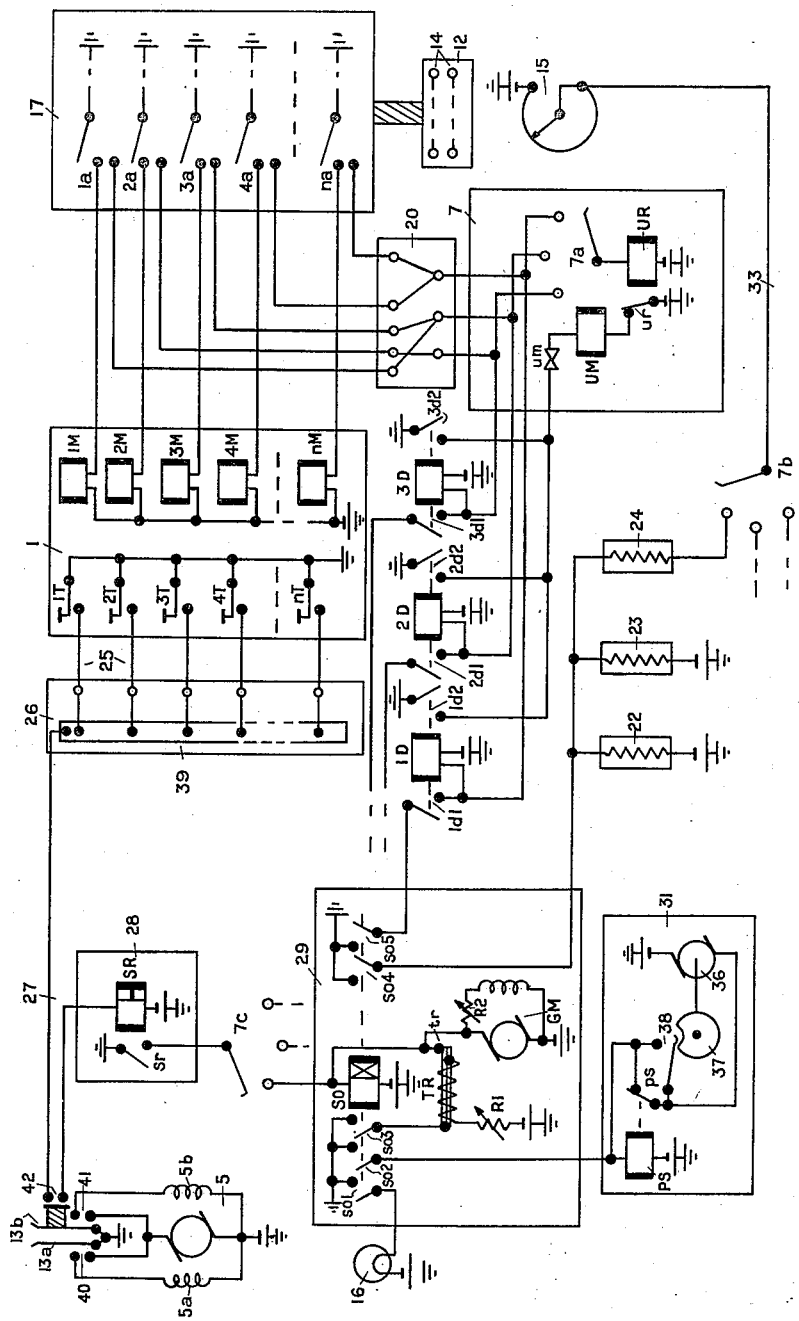

Figs. 4A and 4B give details of a plate feeding arrangement to feed plates to the output of a cooking unit and to convey them to a suitable delivery point;

Fig. 5 gives details of the electrical circuits shown schematically in Fig. 1.

Article dispensing systems are known in which articles are selected from suitable storage bins by the operation of one electrical contact or a combination of contacts for example keys. These keys operate relays in a selective switching device to select and operate a release mechanism associated with the bin holding the selected article. The selected article is thus released from its bin and is conveyed, for example by chutes and conveyor belts to a suitable delivery point.

Such a system is shown schematically in Fig. 1 in which an operator's position 12 has rows of keys 14 to select a plurality of articles of varied character. The articles are stored in suitable bins 1, and some of the bins may be enclosed in a refrigeration chamber 2. Each bin is equipped with a release mechanism (not shown) which can be operated selectively from the keys 14 over the selecting switching device 17. When an article has been released from one of the bins 1, it is transferred via one of the chutes 3, to a conveyor belt 4 driven by a motor 5 to deliver the selected article to a delivery counter 6. Contact arrangements can be provided in the path of a released article to give an indication whenever an article has left its bin.

The abovementioned system is combined according to the invention with a cooking section and provision is made to direct articles either directly to a delivery counter or to transfer them to the cooking section from which they are released after cooking. For this purpose the motor 5 is reversible and can be controlled by keys 13 to either direct the articles to the counter 6 or to the cooking section 8 via a diverter arrangement indicated by the control arm 7a and the chutes 18. Details of the diverter arrangement will be described later on in connection with Fig. 2.

The selective switching device 17 which controls the release mechanism of a wanted article furthermore operates a control device 7 over a jumpering frame 20. Details of this equipment and the circuits are shown in Fig. 5 and will be described later.

The control device 7 not only controls the diverter arrangement 7a but also the contact arms 7b and 7c to relate the various parts of the cooking section to the kind of article released from storage and transferred to the cooking section. Before the functions of these contact arms 7b and 7c are described a description of the cooking section 8 is given hereafter.

Figure 3A:
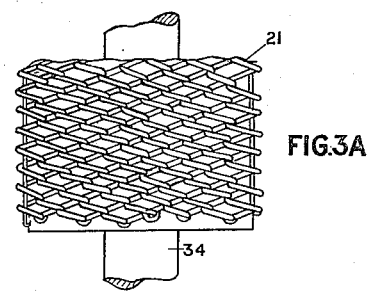
Figs. 3A and 3B show one form of a movable grate or conveyor for the transportation of articles through the cooking unit.
Figure 3B:
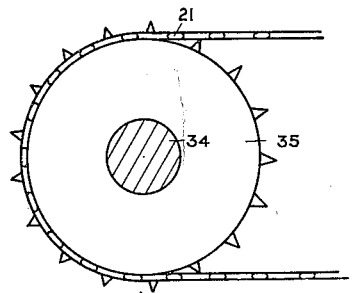

The cooking section 8 consists of a plurality of cooking units 19, three of which are shown in Fig. 1. It must be understood however that any other number of units can be used. Each of the cooking units consists of a movable grate or conveyor 21, part of which is shown in Figs. 3A and 3B. The grate 21 consists of a band of wire-meshing or similar material or for example of a series of ceramic links and is driven by suitable driving means through the shaft 34 and a pulley 35. The pulley 35 is equipped with small teeth which grip in openings of the meshing to drive the grate. The grate 21 of each cooking unit 19 passes a number of heating elements 22, 23 and 24. Although three heating elements are shown for each cooking unit any other number can be used. The heating elements are preferably heated by electric current, and high-frequency current can be used to advantage for this purpose. One or more of these heating elements can be so arranged that the heat is adjustable by the operator. In Fig. 1 this is indicated by a connection between the last heating element 24 of each cooking unit with a corresponding bank contact associated with wiper arm 7b. Arm 7b is electrically connected with keys 15 in the operator's position 12, which permit an adjustment of the heat of heating element 24 of the cooking unit in use at any time.

The driving means for each grate 21 and a timing device to determine the time for which the grate is moving and the heating elements are switched on, are included in the device 29 provided for each cooking unit. To give an indication to the operator when any of the cooking units is in action, the device 29 is connected via a cable 33 with "busy" lamps 16 in the operator's position.

To save energy the driving means for each grate and the heating elements are preferably controlled by the articles themselves, when they are released from their respective bins. For this purpose each bin is equipped with a contact arrangement operated momentarily at the release of an article from this bin and all contact arrangements are connected over lead 25 with a set of terminals of jumpering frame 26. The terminals corresponding to contact arrangements for articles suitable for cooking are connected with a bar of the jumpering frame 26 and over lead 27 with the switching gear 28 in the cooking section. This switching gear is selectively connectable over arm 7c with any one of the devices 29 operating the various cooking units. Details of the electrical circuits will be described later on in connection with Fig. 5.

In cases where many articles have to be selected in the uncooked state, the lead 27 can be interrupted by the operation of one of the keys 13 to prevent an unnecessary starting of a cooking unit.

When an article has passed through the cooking unit on the movable grate in the proper time as determined by the device 29, it is transferred over a chute 30 to the collecting device 31. This device can for example include an arrangement to feed a plate or any other suitable dish underneath the chute 30 whenever an article is released from one of the grates 21. The cooked article is then delivered to the customer over the transfer arrangement 32 and a movable belt 9, driven by a motor 10, at the delivery counter 11. The plate used for this purpose can be made from cardboard or any other cheap material so that it can be thrown away after use to avoid washing of dishes.

Before the operation of the system is described in connection with the circuits of Fig. 5, details of the diverter arrangement 7a and the collecting device 31 will be given hereafter.

Figure 2:
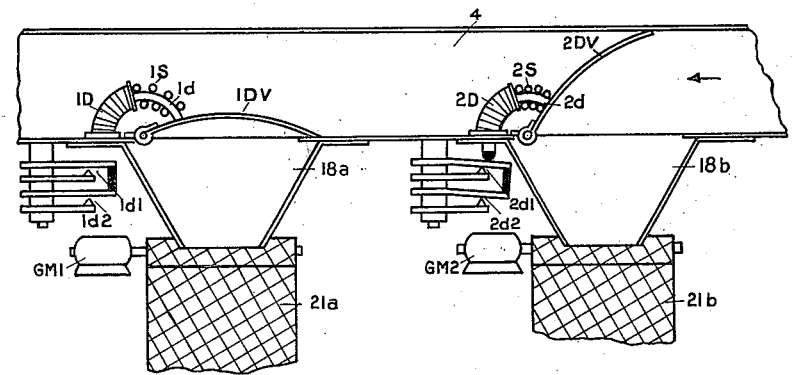
Fig. 2 shows details of a diverter arrangement to direct articles to different cooking units.

Fig. 2 shows two movable grates 21a and 21b driven by driving means, for example electric motors GM1 and GM2. Each movable grate is connected with the common conveyor belt 4 by chutes 18a and 18b respectively. To direct articles from the conveyor belt 4 to one of the chutes, a diverter, 1DV and 2DV respectively, is hinged at the mouth of each chute and is controlled by a solenoid 1D and 2D respectively. In Fig. 2 the diverter 1DV is in its unoperated position closing chute 18a. To hold the diverter in this position a spring 1S encircles the core 1d operable by the solenoid 1D. The solenoid is so arranged that articles on belt 4 can pass underneath. To control electrical circuits when the solenoid is operated a set of contacts 1d1, 1d2 is arranged at the other side of the solenoid 1D. The second diverter 2D shown in Fig. 2 is in its operated position. When the solenoid 2D is energized it attracts the core 2d moving the diverter 2DV into the indicated position and compressing the spring 2S. Articles passing along belt 4 in the direction of the arrow are then diverted into chute 18b and thus onto the movable grate 21b. At the same time the lower end of the core 2d operates the contacts 2d1 and 2d2 to control further circuits as will be described later in connection with Fig. 5.

Details of the collecting device 31 in Fig. 1 which provides a plate for each cooked article are shown in Figs. 4A and 4B. Part of a movable grate 21 is shown, which ends with a chute 30 stretching over a continuously running short conveyor belt 65, which delivers cooked articles to a chute 32 to transfer them to a conveyor belt 9 and thus to a delivery point. Although only one chute 30 is shown, several chutes can be so arranged, for example opposite each other, that they discharge cooked articles onto a plate on belt 65. Underneath chute 30 and on both sides of belt 65 are two bars 43 which are each moved upwards by a solenoid PS through a core 46 and are guided by pins 44 in a suitable bracket 45. At the lower end of the core 46 is arranged a contact set ps operable thereby. Next to the chute 30 and the end of belt 65 is a plate holder 47 which is so arranged at its lower end, that it holds plates 48 (preferably made of cardboard) stacked therein, but permits the lowest plate to be pulled out.

The arrangement to pull a plate out of the holder 47 and to push it underneath chute 30 is shown underneath the plate holder and consists of a motor driven disc 37 with an excentrically fixed arm 49. A contact set 38 operated by disc 37 permits only one revolution of disc 37 for each operation. Linked with arm 49 is a double armed lever 50 and a plunger 51 guided in a bearing 52. Plunger 51 carries at its upper end a suction pad 53 and a small valve inside which is controlled by the small lever 54 and the stop 55. The lever 50 is pivoted at a bracket 56 fixed to the top plate 57. The other end of lever 50 is secured by a string or chain 58 over roller 60 to a slide 59, slidably mounted on top plate 57 between guides 61. The slide 59 is furthermore under the influence of weights 62 which by strings 63 try to pull the slide over the suction pad 53.

Fig. 4A shows the device in its unoperated position. As soon as an article is transferred to a cooking unit for cooking the motor driving the disc 37 for one revolution in the direction of the arrow is started and the suction pad 53 is raised by arm 49 and plunger 51 until it presses itself against the lowest plate 48. The plates are held down against this pressure by a suitable weight 64. When arm 49 has passed its highest point it moves downward whereby the suction pad 53 pulls the lowest plate out of the plate holder 47 while the next plate is held in the holder at the lower rim of the holder. At the further downward movement of plunger 51 the small lever 54 knocks against the stop 55 opening the valve in the suction pad and releasing the plate which now rests on the top plate 59. At the same time the left arm of lever 50 is moved upwards and slide 59 can now move under the influence of the weights 62 to the right pushing the released plate on to the bars 43 which had been raised by the solenoids PS at the same time at which the disc 37 started to move. When the arm 49 has passed its lowest point, the left arm of lever 50 is moved in the opposite direction and pulls over string 58 the slide 48 back to its initial position. When disc 37 has made a full revolution it is stopped again and the arrangement is ready for the next operation.

When the article is cooked and is released from grate 21 over chute 30 onto the plate resting on the bars 43 the solenoids PS are deenergized, the bars 43 move downwards and the plate thus rests now on the belt 65 which transports the plate with the cooked article to chute 32 and thus via conveyor belt 9 to a suitable delivery point 11 (in Fig. 1).

The co-operation of the various parts will now be described in connection with the circuits shown in Fig. 5. Only those circuits are shown in detail which deal with the cooking section of the article dispensing system, while the selection of articles from the bins is indicated only diagrammatically. The operator's position 12 with the selection keys 14 is connected with the selecting switching device 17 to operate one of the contacts $1a$, $2a$, $3a$, $4a$ ... $na$ in accordance with the wanted article. The bin arrangement 1 storing articles of varied character and the associated release mechanisms are indicated in Fig. 5 by the release magnets 1M, 2M, 3M, 4M ... nM, which are selectively operated over the corresponding contacts $1a$ ... $na$ in the selecting switching device 17. Each article at its release operates momentarily an associated trip-contact 1T, 2T, 3T, 4T ... nT respectively which besides other functions that it might fulfill sets the cooking section into operation over a set of terminals at the jumpering frame 26, the bar 39, lead 27, key 13b with contacts 42 and the switching gear 28. It may be mentioned here that for articles which are not suitable for cooking, no connection is provided between corresponding terminals and bar 39 at the jumpering frame 26.

While one of the contacts in the selecting switching device 17 is closed it operates over a jumpering frame 20 the control device 7 which directs the articles to one of the cooking units. The jumpering frame 20 enables the coordination of any article with any of the cooking units. Three cooking units are assumed in the example shown in Fig. 5 and thus the contacts of the selecting switching device 17 are connected with three terminals at the jumpering frame 20 in accordance with the cooking requirements of corresponding articles.

Over the jumpering frame 20 and the control device 7 one of the diverter magnets 1D, 2D or 3D is operated and at the same time a rotary switch with the wipers $7a$, $7b$, $7c$ is stepped up by magnet UM to connect over wiper $7c$ the proper device 29 with the control gear 28. The device 29 for each cooking unit starts the motor GM for the corresponding movable grate, energizes the collecting device 31 (which has been described above in connection with Figs. 4A and 4B) and switches on the heating elements 22, 23 and 24 of the corresponding cooking unit. After a predetermined time interval all circuits are switched off again by the thermal bi-metal switch TR.

The wiper $7a$ locks the magnet UM during this procedure, and over wiper $7b$ the last heating element 24 of each cooking unit is connectible with a regulator 15 to enable a heat regulation by the operator.

The operation of the circuit will now be described in detail in connection with the transfer of an article through the cooking section. It may be assumed that by selecting the article via the keys 14 of the operator's position 12 the contact $4a$ in the selecting switching device 17 has been operated. Over this contact a circuit is closed for the release magnet 4M in the bin arrangement 1 to release the wanted article.

At the same time another circuit is closed from earth over contact $4a$, jumpering frame 20, magnet 1D to battery. Magnet 1D operates and sets the diverter to direct a released article to the corresponding cooking unit as described above in connection with Fig. 2. Magnet 1D furthermore closes its contacts $1d1$ and $1d2$. Over contact $1d2$ a circuit is completed for the stepping magnet UM from earth over contact $1d2$, self-interrupting contact $um$, magnet UM, contact $ur$ to battery. The magnet UM thus steps its wipers $7a$, $7b$, $7c$ up step by step under the influence of interrupter contact $um$.

The earth from contact $4a$ of the device 17 is also connected with one contact of the contact bank covered by wiper $7a$ and as soon as the wiper in its hunting operation reaches this contact a circuit is completed for relay UR from earth over contact $4a$, relay UR to battery. Relay UR opens its contact $ur$ and breaks the stepping circuit for magnet UM so that the wipers $7a$, $7b$ and $7c$ remain now in their set position.

As the selected article is wanted in a cooked state the operator has pressed the key 13b. The keys 13a and 13b are used to start the motor 5 to drive the conveyor 4 (Fig. 1) in one or the other direction as explained above. The motor 5 has two field windings 5a and 5b. When key 13a is operated it closes contact 40 and drives motor 5 with field winding 5a so that released articles are directly delivered to delivery counter 6 (Fig. 1). When key 13b is pressed instead as mentioned above the contact 41 is closed and reverses the motor to transport released articles to the cooking section. Key 13b furthermore closes contact 42 to connect the control gear 28 with the jumpering frame 26.

The selected article is released from its bin by magnet 4M and in passing to the cooking section momentarily closes the trip contact 4T to complete a circuit from earth over contact 4T, lead 25, terminals and bus bar 39 of jumpering frame 26, lead 27, closed contact 42, slow release relay SR of control gear 28 to battery. Relay SR closes its contact sr and connects earth to the wiper 7c. As soon as wiper 7c, operated by magnet UM as mentioned before, comes to rest, the circuit is extended through wiper 7c and slow operating relay SO in the selected device 29 to battery. The relay SO is so adjusted that it does not operate while the wiper passes the contacts during the hunting operation of wiper 7a, but operates as soon as wiper 7c comes to rest.

Relay SO closes its contacts so1, so2, so3, so4 and so5. Over contact so5 a locking circuit is provided for magnet ID from earth over closed contact so5, closed contact id1, magnet ID to battery and this circuit is further extended from contact id1 to the contact bank of wiper 7a, through wiper 7a, relay UR to battery, so that magnet ID and relay UR are both locked in their operated position when contact 4a in the selecting switching device 17 opens again to be ready for another selection. Contact so4 closes a circuit for the heating elements 22 and 23. A further heating element 24 is switched on as well over a contact of contact-bank and wiper 7b, lead 33, regulator 15 to battery. The regulator 15 thus permits a regulation of the heat in the cooking unit within certain limits. At contact so1 a busy lamp 16, which is preferably arranged at the operator's position, is switched on to indicate that a particular cooking unit is busy. Contact so2 closes a circuit from earth over contact so2, magnet PS of the collecting device 31 to battery and a second circuit over contact ps and motor 36 to battery to start motor 36 coupled with disc 37 of the plate feeding arrangement described above in connection with Figs. 4A and 4B. When the motor starts, disc 37 closes the contact 38 to maintain the motor circuit bypassing contact ps which is interrupted by magnet PS. Magnet PS lifts the bars 43 (Figs. 4A and 4B) as mentioned above and disc 37 with its attached levers extracts a plate from the plateholder and moves it onto the bars 43. When the disc 37 has made one revolution the motor circuit is interrupted at contact 38 and the motor stops, as contact ps is still open.

Closing of contact so3 establishes a locking circuit for relay SO from earth over contact so3, bi-metal strip of thermal switch TR, contact tr, relay SO to battery, so that this relay remains energized when relay SR releases again and opens contact sr, as the released article has passed trip-contact 4T. A further circuit extends from contact so3 over the bi-metal strip and contact tr through motor GM to battery. Motor GM drives the movable conveyor or grate in the selected cooking unit to pass the article through the cooking unit to the collecting device 31. The speed of the motor is adjustable by a resistor R2 to set the time for passing the article past the heating elements 22, 23, and 24. A third circuit is established from earth over closed contact so3, the bi-metal strip and winding of the thermal switch TR, resistor R1 to battery to heat the bi-metal strip. After a certain time which is adjustable by resistor R1 in conformity with the speed of motor GM, and which is long enough to release the cooked article to the collecting device 31, the bi-metal strip breaks the contact tr, stops the motor GM and interrupts the locking circuit for relay SO. The relay SO opens its contacts so1 to so5 and returns all parts to their normal position. Contact so1 extinguishes the busy lamp and contact so2 releases magnet PS and thus lowers the plate with the cooked article on to conveyor belt 9 (Figs. 1, 4A, 4B) for delivery. At contact so3 the heating circuit for the thermal switch TR is broken and at the same time the circuit for relay SO and motor GM is further interrupted so that they cannot operate again when the thermal switch TR after cooling off again closes its contact tr.

The heating elements 22, 23 and 24 are switched off at contact so4 and the locking circuit for magnet ID and relay UR is interrupted at contact so5. Magnet ID opens its contact id1 and id2 so that stepping magnet UM cannot operate again when contact ur is closed by the release of relay UR.

Thus the whole system is now ready for the next operation. If necessary contact so5 can be replaced by a time relay which releases the diverter magnet ID and the relay UR as soon as the selected article has reached a cooking unit, so that another article can be passed on to one of the other cooking units. In this case a separate regulator 15 has to be provided for each cooking unit. As indicated in Fig. 5 other cooking units are connected with other contacts of the banks of wipers 7b and 7c and operate upon selection in the same manner. Whether one plate delivery unit is used for each cooking unit or for a plurality of cooking units depends on the requirements in each particular case. Furthermore it is possible to make the resistors R1 and R2 in the same way adjustable from the operator's position as shown for the heating element 24, to alter the time for which the article remains in the cooking unit.

The use of a plurality of heating elements in each cooking unit has the advantage that for example foodstuff coming out of the refrigerator chamber can first be warmed up to a certain extent before it is exposed to the temperature necessary for cooking.

Articles suitable for cooking can be stored in the stock bins in containers which are suitable for cooking purposes, so that an article is conveyed with the container from the stock bin to the cooking section and is delivered after cooking in the same container to the delivery counter.

Furthermore, it is possible to store articles in a precooked state so that they have only to be warmed up in the cooking section.

The foregoing description shows the invention by way of example only. It is possible, for example, to provide a plurality of key sets, so that a plurality of operators can send out electrical signals to set the various control devices and to release articles from the various bins. Any released article is then directed to one of the cooking units in the cooking section and after cooking each article is delivered to an appropriate location. A plurality of delivery counters can be provided as well, so that each customer can select cooked dishes without interfering with another customer.

It is clear that instead of connecting only the last heating element of each cooking unit with the operator's position, provision can be made to adjust each of the elements separately to vary the heat in each cooking unit to a wider extent.

Although in the embodiment shown and described above individual motors are used to drive the various movable parts, these motors can be replaced by clutches which selectively connect the various parts with common driving means.

These and other modifications in the system as well as in the cooking section can be made without departing from the spirit of the invention.

I claim:

1. System for dispensing articles of varied character, comprising: a plurality of storage and dispensing devices for selectively dispensing therefrom articles including articles suitable for cooking; means including contact members and switching means electrically connected with said storage and dispensing devices for the selective operation thereof; means to convey dispensed articles to a delivery point; a cooking section; means to selectively divert dispensed articles suitable for cooking to said cooking section, said cooking section including means to move said articles through said cooking section and heating means to cook said articles while passing through said section; and means to convey said cooked articles to a delivery point.

2. System for dispensing articles of varied character, comprising: a plurality of storage and dispensing devices for selectively dispensing therefrom articles suitable for cooking; means for the selective operation of said storage and dispensing devices; a conveyor belt to convey dispensed articles to a delivery point; driving means for said conveyor belt; switching means associated with said driving means to reverse the direction of movement of said conveyor belt; a cooking section adjacent to said conveyor belt to receive articles from said belt when it moves in the reverse direction; and further conveying means associated with said cooking section to convey articles from said cooking section to a delivery point.

3. System for dispensing articles of varied character, comprising: a plurality of storage and dispensing devices for selectively dispensing articles therefrom; switching means for the selective operation of said storage and dispensing devices; a cooking section; conveying means associated with said storage and dispensing devices and said cooking section to convey dispensed articles to said cooking section, said cooking section comprising a plurality of cooking units; diverting means operable by said switching means to transfer a dispensed article to one of said cooking units, said cooking unit being electrically connectable with and controllable by the storage and dispensing device of the selected article, and further conveying means to convey a cooked article to a delivery point.

4. System for dispensing articles of varied character, comprising: a plurality of storage and dispensing devices for selectively dispensing articles therefrom; switching means for the selective operation of said storage and dispensing devices; a cooking section associated with said storage and dispensing devices and adapted to receive articles dispensed therefrom, said cooking section including a plurality of cooking units, each cooking unit including a plurality of heating elements and a movable grate passing said heating elements; driving means for said movable grate and electrical connections therefrom to said storage and dispensing devices to control said driving means depending on the dispensing of an article therefrom; means to adjust the temperature of said heating elements in accordance with the kind of article to be cooked; and means to convey a cooked article to a delivery point.

5. System for dispensing articles of varied character, comprising: a plurality of storage and dispensing devices for selectively dispensing articles therefrom; first switching means for the selective means for the selective operation of said storage and dispensing devices; a cooking section associated with said storage and dispensing devices and adapted to receive articles dispensed therefrom, said cooking section including a plurality of cooking units, each cooking unit having a plurality of heating elements heated by electrical current of high frequency; further switching means electrically connected with and operated by said first switching means to select one of said cooking units for operation; and a control device electrically connectable with said heating elements by said further switching means to adjust the temperature of said heating elements.

6. System for dispensing articles of varied character, comprising: a plurality of storage and dispensing devices for selectively dispensing articles therefrom; first switching means for the selective operation of said storage and releasing devices; a cooking section associated with said storage and dispensing devices and adapted to receive articles dispensed therefrom, said cooking section including a plurality of cooking units; control means electrically connected with said storage and dispensing devices and operable by an article dispensed therefrom, further switching means electrically connected with said first switching means, and operable thereby to connect said control means with one of said cooking units; a diverter arrangement electrically operable by said further switching means to direct a dispensed article to a corresponding cooking unit, each cooking unit including means operable by said control means to bring said cooking unit into operation and a timing device to switch said cooking unit off after a predetermined time interval; and means to convey articles passed through said cooking unit to a delivery point.

7. System for dispensing articles of varied character, comprising: a plurality of storage and dispensing devices for selectively dispensing articles therefrom, each storage and dispensing device including an electrical contact device disposed for momentary actuation by each article dispensed from said storage and dispensing devices, respectively; first switching means for the selective operation of said storage and releasing devices; a cooking section associated with said storage and releasing devices and adapted to receive articles dispensed therefrom, said cooking section including a plurality of cooking units; control means for the control of said cooking units; a first jumpering frame and electrical connections therefrom to said storage and dispensing devices and said control means respectively; further switching means electrically connected with said first switching means; a second jumpering frame interposed between said first switching means and said further switching means, said further switching means being adapted to connect said control means with any of said cooking units for the operation thereof; means under the control of said further switching means to transfer dispensed articles to a corresponding cooking unit and conveying means to convey articles from said cooking unit to a delivery point.

8. System for dispensing articles of varied character, comprising: a plurality of storage and dispensing devices for selectively dispensing therefrom articles including articles suitable for cooking; means including contact members and first switching means electrically connected with said storage and dispensing devices for the selective operation thereof; first conveying means to convey dispensed articles to a delivery point, driving means for said first conveying means and means to reverse the direction of movement of said first conveying means; a cooking section adjacent to said first conveying means and adapted to receive articles from said first conveying means while moving in the reverse direction, said cooking section including a plurality of cooking units; a diverter arrangement associated with said conveying means and said cooking units to selectively direct articles to one of said cooking units; further switching means electrically connected with and operable by said first switching means to actuate said diverter arrangement corresponding to the operation of said first switching means; control means operable by a dispensed article and electrically connectable with any of said cooking units by said further switching means to actuate said cooking units; a timing device in each of said cooking units to stop the operation of an actuated cooking unit after a predetermined time; second conveying means adjacent to said cooking section to receive articles therefrom and to convey them to a delivery point; and a plate feeding arrangement interposed between said cooking section and said second conveying means to pass a plate on to said further conveying means when an article is passed through said cooking section.

GEORG FRIEDRICH CHODZIESNER.

REFERENCES CITED

The following references are of record in the file of this patent:

UNITED STATES PATENTS

| Number | Name | Date |
|---|---|---|
| Re. 19,685 | Brand | Sept. 3, 1935 |
| 1,077,162 | Rodakowski | Oct. 28, 1913 |
| 1,716,266 | Flamm | June 4, 1929 |
| 2,151,401 | Belcher | Mar. 21, 1939 |
| 2,373,076 | Engels | Apr. 3, 1945 |
| 2,384,863 | Warner | Sept. 18, 1945 |
| 2,392,511 | Thompson et al. | Jan. 8, 1946 |